(12) United States Patent
King

(10) Patent No.: US 7,641,458 B2
(45) Date of Patent: Jan. 5, 2010

(54) SYSTEMS FOR PROVIDING A LABELING REGION ON A VEHICULAR BODY PANEL

(75) Inventor: Darin D. King, Raymond, OH (US)

(73) Assignee: Honda Motor Company, Ltd., Tokyo (JP)

(*) Notice: Subject to any disclaimer, the term of this patent is extended or adjusted under 35 U.S.C. 154(b) by 516 days.

(21) Appl. No.: 11/496,091

(22) Filed: Jul. 31, 2006

(65) Prior Publication Data

US 2008/0023878 A1    Jan. 31, 2008

(51) Int. Cl.
    *B29C 33/32*    (2006.01)
(52) U.S. Cl. .................... 425/3; 249/102; 425/190; 425/192 R; 425/195
(58) Field of Classification Search ............... 249/102, 249/103, 104; 425/3, 190, 192 R, 195
    See application file for complete search history.

(56) References Cited

U.S. PATENT DOCUMENTS

| | | | | |
|---|---|---|---|---|
| 3,431,601 | A * | 3/1969 | Lipscomb | 425/195 |
| 3,530,022 | A * | 9/1970 | Mallory | 425/3 |
| 3,602,496 | A | 8/1971 | Langenohl et al. | |
| 3,910,748 | A | 10/1975 | Kopernik | |
| 3,961,013 | A * | 6/1976 | Gutlhuber et al. | 425/3 |
| 4,295,628 | A * | 10/1981 | Kupf et al. | 249/103 |
| 4,625,101 | A * | 11/1986 | Hinks et al. | 425/47 |
| 4,979,720 | A * | 12/1990 | Robinson | 249/103 |
| 5,433,592 | A * | 7/1995 | Marsilio | 249/102 |
| 5,604,006 | A | 2/1997 | Ponchaud et al. | |
| 5,609,810 | A * | 3/1997 | Fujiwara et al. | 249/102 |
| 5,614,146 | A | 3/1997 | Nakamura et al. | |
| 5,736,168 | A | 4/1998 | Goyal et al. | |
| 5,939,002 | A | 8/1999 | Heindel | |
| 6,368,538 | B1 | 4/2002 | Kitterman | |
| 6,464,922 | B1 | 10/2002 | Bogdan | |
| 6,659,750 | B1 | 12/2003 | Overmyer et al. | |
| 6,790,400 | B1 | 9/2004 | Muller et al. | |
| 6,942,476 | B2 * | 9/2005 | Parmelee et al. | 425/3 |

OTHER PUBLICATIONS

US2004/0084809 A1, Vanderploeg et al., May 6, 2004.
US2005/0161851 A1, Tachauer et al., Jul. 28, 2005.

* cited by examiner

*Primary Examiner*—James Mackey
(74) *Attorney, Agent, or Firm*—Ulmer & Berne LLP

(57) ABSTRACT

A system includes a mold having a receptacle. The mold is configured to form a body panel of a vehicle. Alternating inserts are each configured to be selectively retained by and released from the receptacle. Each respective alternating insert, when selectively retained by the receptacle, is configured to form a labeling region on a body panel formed in the mold. A method for forming a body panel of a vehicle includes providing a mold having a receptacle. A first insert is selectively retained within the receptacle, and a first body panel is formed in the mold to have a first labeling region provided by the first insert. The first insert is released from the receptacle and a second insert is selectively retained within the receptacle. A second body panel is formed in the mold to have a second labeling region provided by the second insert.

10 Claims, 4 Drawing Sheets

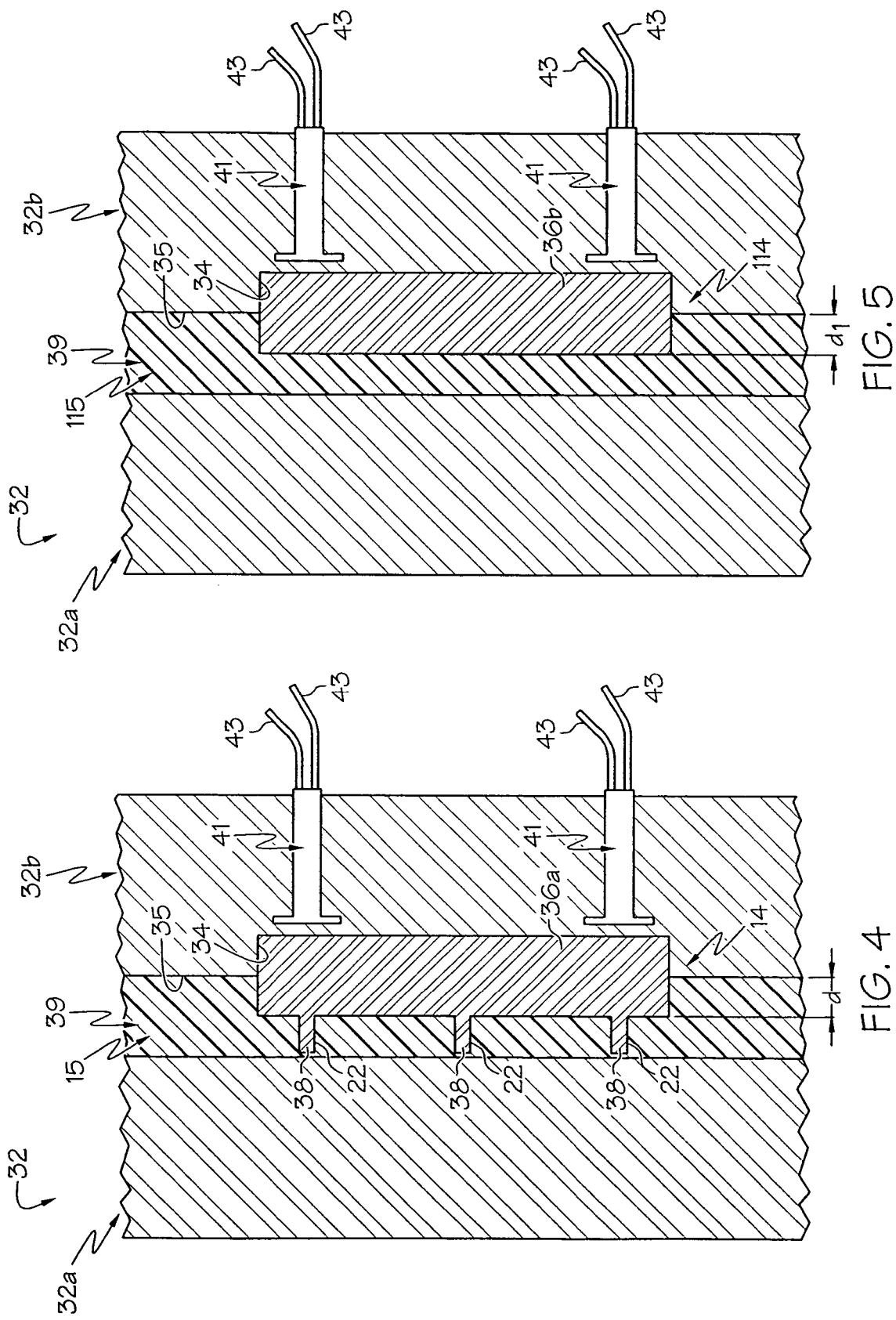

SYSTEMS FOR PROVIDING A LABELING REGION ON A VEHICULAR BODY PANEL

TECHNICAL FIELD

The present invention generally relates to systems and methods for providing a labeling region on a vehicular body panel.

BACKGROUND OF THE INVENTION

Labels are often placed on vehicles to instruct and warn operators, to promote or designate a particular brand or trademark, and/or to add decoration. Conventional plastic molding systems and methods can be used to manufacture a vehicular body panel (e.g., a fender) to include a labeling region. In some circumstances, the labeling region is formed during a molding process to include apertures. A label can then be attached to the labeling region such as through use of fasteners (e.g., rivets) inserted through the label and into the apertures. Adhesives may additionally or alternatively be employed for securement of a label to a labeling region of a vehicular body panel. In another conventional configuration, a label can be attached to a vehicular body panel during molding of the vehicular body panel through use of an in-mold labeling process.

It can, at times, be desirable for a manufacturer of vehicular body panels to alternate the manner in which labels are applied to manufactured vehicular body panels. For example, a manufacturer of fenders might typically employ an in-mold labeling process to apply labels to fenders. However, if a problem arises with the in-mold labeling equipment, until the equipment is repaired, the manufacturer might resort to use of fasteners for attaching labels to the fenders. In such circumstance, the molds of the plastic molding process must either be changed out to include aperture-forming molds, or apertures must be manually provided (e.g., drilled) in each manufactured fender to accommodate the fasteners for the labels. Accordingly, alternating between conventional label application techniques can require significant time and cost expenditure.

SUMMARY OF THE INVENTION

In accordance with one embodiment of the present invention, a system provides a labeling region on a vehicular body panel. The system includes a mold, a first insert and a second insert. The mold comprises a receptacle and is configured to form a body panel of a vehicle during a molding process. The first insert is configured to be selectively retained by the receptacle to form a labeling region on a body panel formed in the mold during the molding process, wherein the first insert is selectively retained by the receptacle with a magnetic field. The second insert is configured to be selectively retained by the receptacle to form an alternate labeling region on a second body panel in the mold during a molding process once the first insert has been selectively released from the receptacle, wherein the second insert is selectively retained by the receptacle with a magnetic field.

In accordance with another embodiment of the present invention, a system provides a labeling region on a vehicular body panel. The system includes a mold and alternating inserts. The mold comprises a receptacle and is configured to form a body panel of a vehicle during a molding process. The alternating inserts are each configured to be selectively retained by and released from the receptacle. Each respective alternating insert, when selectively retained by the receptacle, is configured to form differing labeling regions on respective body panels formed in the mold.

In accordance with yet another embodiment of the present invention, a method for providing a labeling region on a vehicular body panel includes providing a mold for forming a body panel of a vehicle. The mold comprises a receptacle. A first insert is selectively retained within the receptacle with a magnetic field. A first body panel is formed in the mold to have a first labeling region provided by the first insert. The first insert is released from the receptacle. A second insert is selectively retained within the receptacle with a magnetic field. A second body panel is formed in the mold to have a second labeling region provided by the second insert.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

FIG. 4 is a partial cross-sectional view depicting a labeling region on a body panel formed in a mold having a first insert in accordance with one embodiment of the present invention;

FIG. 5 is a partial cross-sectional view depicting a labeling region on a body panel formed in a mold having a second insert in accordance with one embodiment of the present invention;

DETAILED DESCRIPTION OF EMBODIMENTS

Embodiments of the present invention and its operation are hereinafter described in detail in connection with the views and examples of FIGS. 1-7, wherein like numbers indicate the same or corresponding elements throughout the views. While conventional systems and methods are configured to create only a single type of labeling region during a molding process, systems and methods in accordance with the present invention can facilitate formation of different types of labeling regions without need for time-consuming and expensive equipment changeovers. In particular, systems and methods in accordance with embodiments of the present invention include a mold which is capable of receiving alternate inserts, wherein body panels formed by the mold can include differing labeling regions depending upon which insert is provided within the mold.

Figure 1:
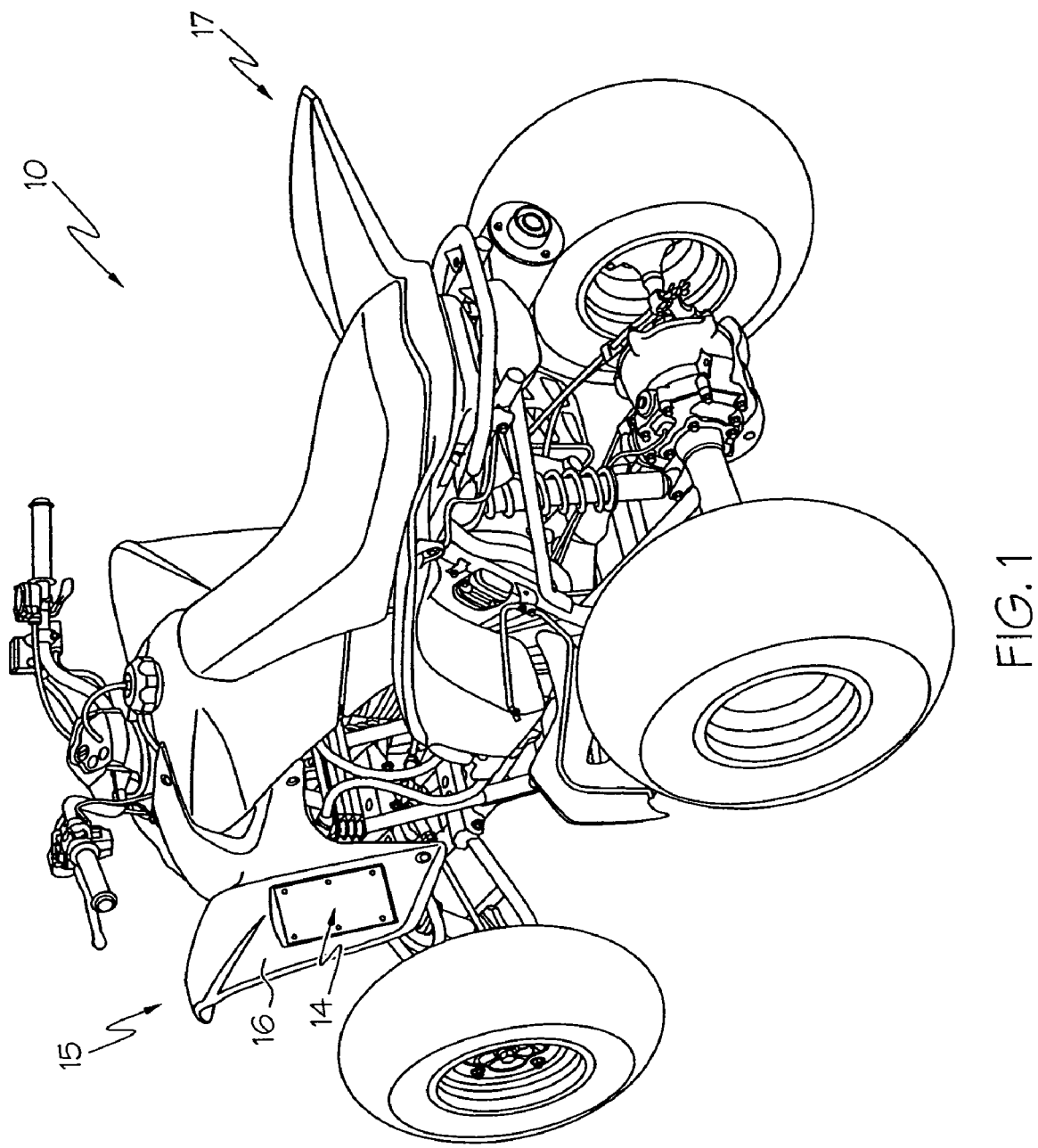
FIG. 1 is a perspective view depicting an all terrain vehicle ("ATV") having a fender with a labeling region in accordance with one embodiment of the present invention.

An ATV 10 is depicted in FIG. 1 to include body panels which include at least one labeling region. In particular, a left front fender 15 is shown to have an upper surface 16 which includes a labeling region 14. A labeling region can alternatively or additionally be located on another body panel of the ATV such as, for example, the right rear fender 17. It will be appreciated that any of a variety of alternative vehicular body panels having a labeling region can be formed in accordance with the teachings of the present invention. Such body panels can be provided upon the interior or exterior of any of a variety of vehicles, tools, or machines such as, for example, an automobile, truck, van, motorcycle, recreational vehicle, watercraft, aircraft, agricultural equipment, construction equipment, toy, mower, generator, pressure washer, snow blower, or snowmobile.

Figure 3:
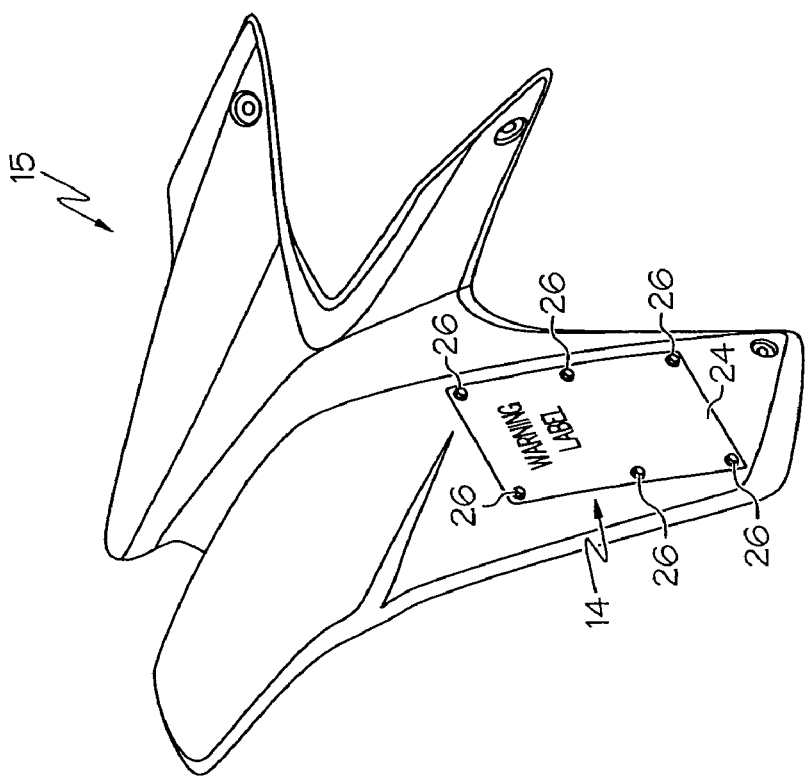
FIG. 3 is a perspective view depicting the fender of FIG. 2 and including a label attached to the labeling region.
Figure 2:
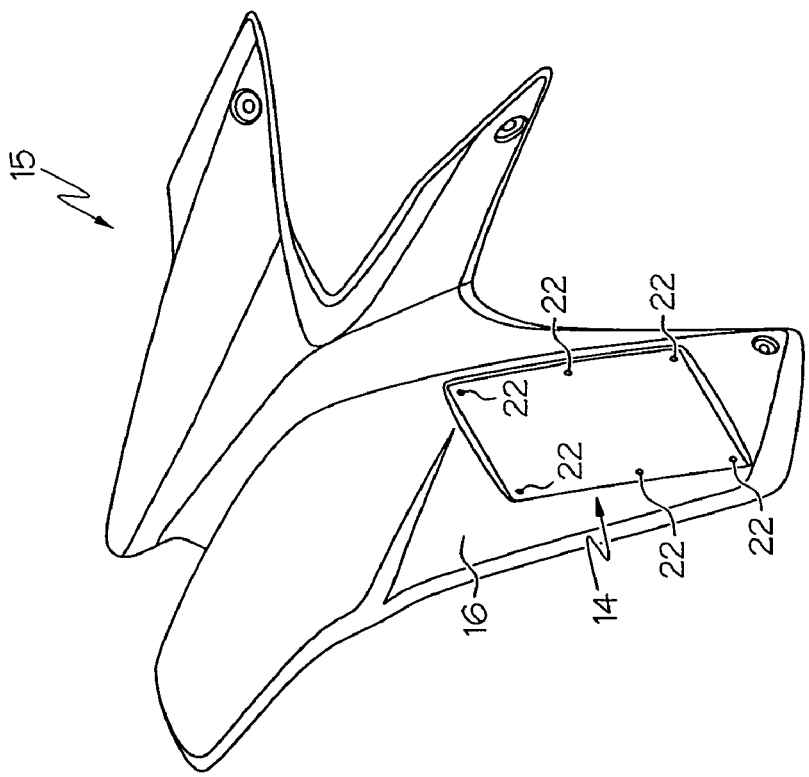
FIG. 2 is a perspective view depicting the fender of FIG. 1 removed from the ATV.
Figure 7:
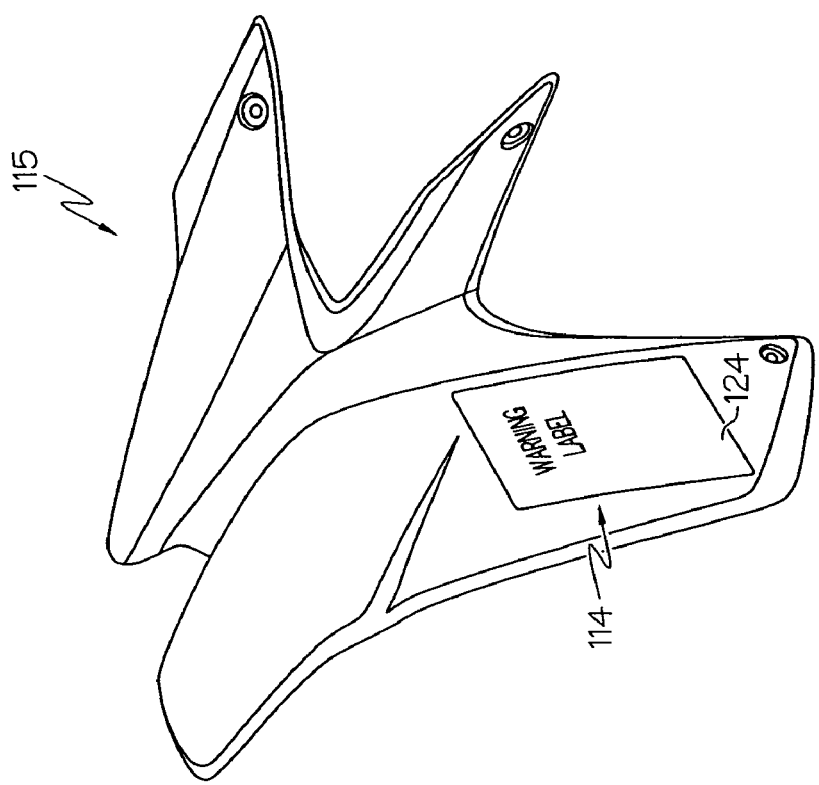
FIG. 7 is a perspective view depicting the fender of FIG. 6 and including a label attached to the labeling region.

FIG. 2 more clearly illustrates the labeling region 14 formed into the left front fender 15. The labeling region 14 is shown to include apertures 22 which are configured to receive fasteners (26 in FIG. 3) for attachment of a label (24 in FIG. 3) to the labeling region 14. FIG. 3 depicts the label 24 attached to the labeling region 14 of the left front fender 15 with fasteners 26 (e.g., rivets). The fasteners 26 are shown to be positioned about the periphery of the label 24 and to penetrate the label 24 for insertion into the apertures 22 (see FIG. 2) in the labeling region 14. The fasteners 26 thereby attach the label 24 to the labeling region 14 of the left front fender 15. In some circumstances, adhesives might additionally be provided between the label 24 and the left front fender 15 to facilitate attachment of the label 24 to the left front fender 15.

FIG. 4 illustrates a portion of a mold 32 for use in forming the left front fender 15. The mold 32 has first and second portions 32a and 32b which together define a cavity 39 for forming the left front fender 15. During the molding process, pressurized liquefied plastic resin fills open spaces within the cavity 39, thereby forming the left front fender 15 when the resin hardens. As shown in FIG. 4, the second portion 32b of the mold 32 includes a receptacle 34. The receptacle 34 can have any of a variety of shapes and sizes and can be configured to selectively retain one of a selection of available inserts (e.g., 36a or 36b in FIGS. 4-5) configured to form a labeling region on left front fenders during the molding process as described in further detail below.

The receptacle 34 selectively retains alternative inserts (e.g., 36a or 36b in FIGS. 4-5) through use of magnetic field. The magnetic field can be provided in any of a variety of arrangements. In one particular embodiment, each of the inserts suitable for use with the receptacle 34 comprises ferrous material, and the receptacle 34 provides a magnetic field which attracts and retains the inserts. The receptacle 34 can provide the magnetic field through use of permanent magnet material and/or electromagnet(s) associated with the receptacle 34, and/or in any of a variety of other arrangements. In one particular, example, as shown in FIGS. 4-5, electromagnets 41 are shown to be associated with the receptacle 34 and to include wires 43. When electrical power is provided via the wires 43 to the electromagnets 41, the electromagnets 41 generate a magnetic field which retains an insert (e.g., 36a, 36b) within the receptacle 34.

In another embodiment, each of the inserts suitable for use with the receptacle 34 provides a magnetic field (e.g., from permanent magnet material attached to the insert) which results in attraction of the insert to ferrous material of a receptacle, which attraction thereby results in retention of the insert within the receptacle. In still another embodiment of the present invention, each of the inserts includes both ferrous and permanent magnet materials, and the receptacle includes both ferrous material and an electromagnet, wherein the ferrous material of the receptacle is attracted to the permanent magnet material of the insert, and the ferrous material of the insert is attracted to the electromagnet of the receptacle. A variety of alternative configurations will also be contemplated by those skilled in the art for to providing a magnetic attraction between a receptacle and an insert.

When the first insert 36a is retained within the receptacle 34, as shown in FIG. 4, part of the first insert 36a can extend beyond the face 35 of the second portion 32b of the mold 32 which resides adjacent to the receptacle 34. This extension is shown in FIG. 4 as having a depth (d) for forming the labeling region 14 as a recess in the left front fender 15 during the molding process. The recess can be sized to accommodate a label 24 (shown in FIG. 3) such that, once the label 24 is installed upon the labeling region 14, the visible surface of the label 24 is generally flush with adjacent portions of the left front fender 15, as shown in FIG. 3. It will be appreciated that a flush configuration can provide aesthetic advantages and can help protect the label 24 from inadvertent damage or peeling during operation of the ATV 10. However, in an alternative embodiment of the present invention, the first insert can be retained within the receptacle 34 without any portion of the first insert extending beyond the face 35 of the second portion 32b of the mold 32 which resides adjacent to the receptacle 34, whereby the first insert, when retained within the receptacle 34, can be configured to form a labeling region which is not recessed with respect to adjacent portions of a vehicular body panel.

The first insert 36a is shown in FIG. 4 to include at least one protrusion 38. The protrusions 38 can be configured to form the apertures 22 (see FIG. 2) within the labeling region 14 of the left front fender 15 during the molding process. The apertures 22 may extend partially or completely through the left front fender 15, and are shown in FIG. 4 to extend only partially through the left front fender 15. Each aperture 22 can be configured for receiving a fastener, such as a rivet 26 (see FIG. 3). In this configuration, when the first insert 36a is retained within the receptacle 34, the mold 32 can be used to form a left front fender 15 having a labeling region 14 including apertures 22 for receiving fasteners to facilitate attachment of a label 24 (shown in FIG. 3).

Between molding processes, the first insert 36a can be removed from the receptacle 34 and can be replaced with an alternative insert (e.g., second insert 36b). The first insert 36a can be selectively removed from the receptacle 34 in any of a variety of ways. For example, if an electromagnet (e.g., 41 in FIG. 4) is used to magnetically attract the receptacle 34 and the first insert 36a, power to the electromagnet can be temporarily removed or reduced so that the first insert 36a may be released from the receptacle 34. Conversely, if permanent magnets are used to attract the receptacle 34 and the first insert 36a, the first insert 36a can be removed with a more powerful magnet or through use of force stronger than that imposed by the permanent magnets.

As with the first insert 36a, the second insert 36b can be magnetically retained by the receptacle 34, as shown in FIG. 5. The second insert 36b can form a different labeling region 114 than the labeling region 14 formed by the first insert 36a. As illustrated in FIG. 5, the second insert 36b can extend beyond the face 35 of the second portion 32b of the mold 32 which resides adjacent to the receptacle 34. This extension is shown in FIG. 5 to have a depth ($d_1$) and to be configured for forming a recess in the labeling region 114 of the left front fender 115 during the molding process. However, the second insert can alternatively be retained within the receptacle 34 without any portion of the second insert extending beyond the face 35 of the second portion 32b of the mold 32 which resides adjacent to the receptacle 34, whereby such a configuration can form a labeling region which is not recessed with respect to adjacent portions of a vehicular body panel.

Figure 6:
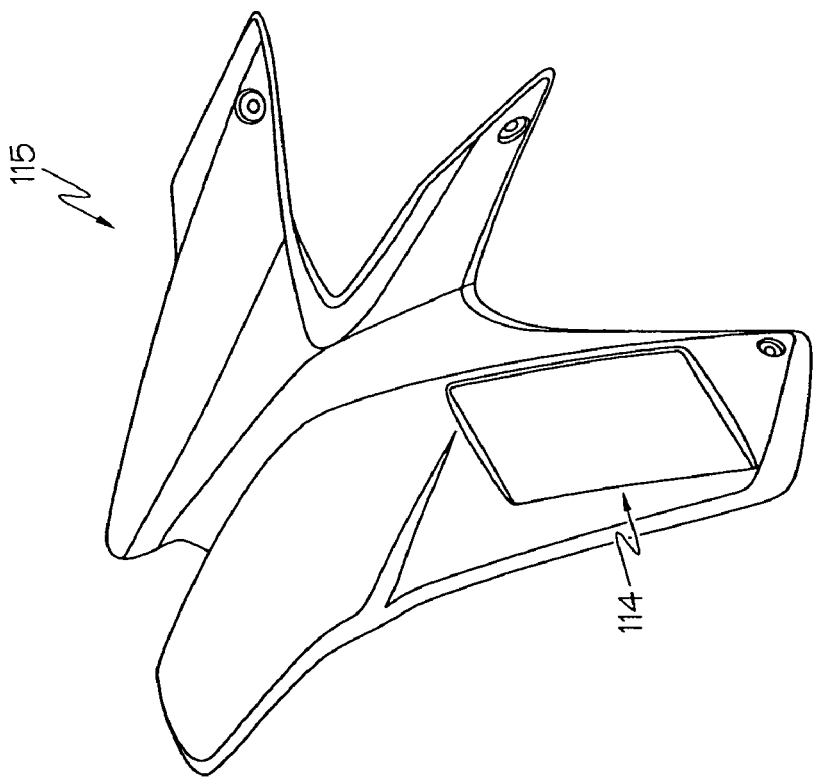
FIG. 6 is a perspective view depicting a fender of an ATV having a labeling region formed by the second insert of FIG. 5.

The second insert 36b is shown in FIG. 5 to be configured to form an alternate labeling region 114 of a second left front fender 115 as a substantially flat surface as shown in FIG. 6. A substantially flat labeling surface (i.e., not including apertures for receiving fasteners) can be suitable for receiving a label 124 attached with adhesive and/or in an in-mold labeling process as shown, for example, in FIG. 7. It will be appreciated that the labeling region 114 can be substantially flat but nevertheless recessed into a body panel as shown, for example, in the embodiment of FIG. 6. Between molding processes, the second insert 36b can be removed from the receptacle 34 and can be replaced with an alternative insert (e.g., the first insert 36a). The second insert 36b can be selectively removed from the receptacle 34 in any of a variety of ways as described above with respect to removal of the first insert 36a from the receptacle 34.

Accordingly, the receptacle 34 selectively retains alternating inserts (e.g., the first insert 36a and the second insert 36b) at different times. When the receptacle 36 is provided with an electromagnet, a controller can be configured to selectively actuate the electromagnet for alternatively selectively attracting the alternating inserts (e.g., the first insert 36a and the second insert 36b). In particular, power can be provided to the electromagnet by the controller to selectively retain the first insert 36a within the receptacle 34 before the molding process begins. Once the first insert 36a is selectively retained by the receptacle 34, the molding process may produce as many body panels as desired, wherein each of the body panels has a labeling region in a first configuration (e.g., 14 in FIG. 2). Power can then be removed from the electromagnet by the controller so that the first insert 36a can be removed from the receptacle 34 and replaced with the second insert 36b. Power can again be provided to the electromagnet by the controller to selectively retain the second insert 36b within the receptacle 34 before the molding process begins again. Once the second insert 36b is selectively retained by the receptacle 34, the molding process may produce as many body panels as desired, wherein each of the body panels has a labeling region in a second configuration (e.g., 114 in FIG. 6).

It should be appreciated that a method or system in accordance with one embodiment of the present invention can involve more than two differing inserts for selective association with a receptacle of a given mold. It will also be appreciated that respective inserts can be provided to have a different number of protrusions, labeling region size, labeling region shape, and/or other characteristics. In other embodiments, respective inserts can be provided to have different dimensions for creating labeling regions recessed at varying depths in vehicular body panels. A manufacturer of vehicular body panels can accordingly achieve significant variation in the labeling regions of manufactured panels by mere replacement of an insert present within the receptacle of a mold. As magnetic fields can be used to retain an insert within a receptacle of a mold, replacement of the insert can be accomplished easily and quickly and in any of a variety of manners as described above. Also, it will be appreciated that a single mold might include multiple receptacles for simultaneously receiving multiple inserts such as may be used to form one or more labeling regions upon a vehicular body panel.

The foregoing description of embodiments and examples of the invention has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate the principles of the invention and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A system for providing a labeling region on a vehicular body panel, the system comprising:

a mold comprising a first portion and a second portion which together define a cavity configured to form a body panel of a vehicle during a molding process, the first portion comprising a first surface and the second portion comprising a second surface spaced from and facing the first surface, the second portion further comprising a receptacle adjacent to the second surface;

a first insert comprising a third surface and at least one protrusion extending from the third surface, the first insert being configured to be selectively retained by the receptacle with a magnetic field, wherein, when the first insert is selectively retained by the receptacle, the third surface of the first insert is positioned within the cavity facing the first surface of the first portion of the mold and spaced from the second surface of the second portion of the mold, and the at least one protrusion extends toward the first surface of the first portion of the mold, such that the first insert is configured to form a labeling region as a recess, with at least one aperture therein, on a body panel formed in the mold during the molding process; and a second insert comprising a substantially flat fourth surface, the second insert being devoid of protrusions extending from the fourth surface, the second insert being configured to be selectively retained by the receptacle with a magnetic field, wherein, when the second insert is selectively retained by the receptacle, the fourth surface of the second insert is positioned in the cavity facing the first surface of the first portion of the mold and spaced from the second surface of the second portion of the mold, such that the second insert is configured to form a substantially flat and recessed alternate labeling region, devoid of apertures, on a second body panel formed in the mold during the molding process once the first insert has been selectively released from the receptacle.

2. The system as recited in claim 1, wherein said protrusion is configured to form in a labeling region of a body panel at least one aperture configured for receiving a fastener.

3. The system as recited in claim 1, wherein said protrusion is configured to form in a labeling region of a body panel at least one aperture configured for receiving a rivet.

4. The system as recited in claim 1, wherein the receptacle provides the magnetic field.

5. The system as recited in claim 4, wherein each of the first insert and the second insert comprise ferrous material.

6. The system as recited in claim 5, further comprising an electromagnet associated with the receptacle and configured to provide the magnetic field.

7. The system as recited in claim 6, further comprising a controller configured to selectively actuate the electromagnet for alternatively selectively attracting the first insert and the second insert.

8. A system for providing a labeling region on a vehicular body panel, the system comprising:

a mold comprising a first portion and a second portion which together define a cavity configured to form a body panel of a vehicle during a molding process, the first portion comprising a first surface and the second portion comprising a second surface spaced from and facing the first surface, the second portion further comprising a receptacle adjacent to the second surface; and alternating inserts each configured to be selectively retained by and released from the receptacle, wherein each respective alternating insert, when selectively retained by the receptacle, is configured to form differing labeling regions on respective body panels formed in the mold, the receptacle providing a magnetic field and each of the alternating inserts being configured to be retained with the magnetic field; wherein a first one of the alternating inserts comprises a third surface and at least one protrusion extending from the third surface, wherein, when the first one of the alternating inserts is retained by the receptacle, the third surface of the first one of the alternating inserts is positioned within the cavity facing the first surface of the first portion of the mold and spaced from the second surface of the second portion of the mold, and the at least one protrusion extends toward the first surface of the first portion of the mold, such that the first one of the alternating inserts is configured to form a first labeling region as a recess, with at least one aperture therein, on a first body panel formed in the mold during the molding process; and a second one of the alternating inserts comprises a substantially flat fourth surface and is devoid of protrusions extending from the substantially flat fourth surface, and wherein, when the second one of the alternating inserts is retained by the receptacle, the substantially flat fourth surface of the second one of the alternating inserts is positioned in the cavity facing the first surface of the first portion of the mold and spaced from the second surface of the second portion of the mold, such that the second one of the alternating inserts is configured to form a substantially flat and recessed second labeling region on a second body panel formed in the mold during the molding process.

9. The system as recited in claim 8, wherein the at least one protrusion comprises a plurality of protrusions, each of the protrusions having a cross-sectional shape complementary with a shape of a generally round aperture, such that the first one of the alternating inserts is configured to form a first labeling region as a recess, with a plurality of generally round apertures therein, on a first body panel formed in the mold during the molding process.

10. The system as recited in claim 9, further comprising an electromagnet, wherein each of the alternating inserts comprises ferrous material, and wherein the electromagnet is associated with the receptacle and is configured to provide the magnetic field.

* * * * *